United States Patent

[11] 3,623,966

[72] Inventor William B. Hughes
 Bartlesville, Okla.
[21] Appl. No. 16,973
[22] Filed Mar. 5, 1970
[45] Patented Nov. 30, 1971
[73] Assignee Phillips Petroleum Company

[54] PHOTODIMERIZATION OF ACRYLONITRILE
 10 Claims, No Drawings
[52] U.S. Cl. .................................................... 204/158 R
[51] Int. Cl. ...................................................... B01j 1/10
[50] Field of Search ........................................... 204/158 R

[56] References Cited
UNITED STATES PATENTS
3,475,305 10/1969 Wakamatsu et al. .......... 204/158
3,483,103 12/1969 Wakamatsu et al. .......... 204/158

Primary Examiner—Howard S. Williams
Attorney—Young and Quigg

ABSTRACT: Acrylonitrile is photodimerized to 1,2-dicyano-cyclobutane in the presence of an activator of $Mo(CO)_6$ or $W(CO)_6$. Preferably, a promoter such as triphenylphosphine is employed in combination with the activator.

PHOTODIMERIZATION OF ACRYLONITRILE

This invention relates to the photodimerization of acrylonitrile. In another aspect, this invention relates to the dimerization of acrylonitrile to 1,2-dicyanocyclobutane.

The 1,2-dicyanocyclobutane product of this invention is a well-known material and can be prepared by a number of thermal processes. Such processes generally operate at temperatures above about 200° C. Because acrylonitrile has a strong tendency to produce high polymers, polymerization inhibitors generally are required with these thermal processes.

It also is known that the acrylonitrile can be cyclodimerized using photoexcitation by ultraviolet light at relatively low temperatures such as at room temperature. However, to be effective, the photoexcitation process requires a sensitizer, and materials such as certain ketones are used for this purpose. The photodimerization process also has a tendency to produce the undesirable solid polymers and, accordingly, polymerization inhibitors are generally used here too. Thus, one photodimerization process uses benzophenone as an ultraviolet sensitizer and ammonia water as a polymerization inhibitor.

It now has been found that certain metal compounds can be used to sensitize, or activate, the ultraviolet catalyzed conversion of acrylonitrile to the cyclic dimer. Moreover, these metal compounds appear to function not only as ultraviolet sensitizers but also as polymerization inhibitors. Thus, the use of molybdenum or tungsten hexacarbonyl will convert acrylonitrile to the cyclodimer with little or no solid polymeric byproducts.

To still further improve the effectiveness of the dimerization system of this invention, a number of promoter materials have been found useful. Because of the degree of improvement afforded by these promoter materials, their presence in the dimerization system is preferred.

Accordingly, an object of this invention is to provide a process for the dimerization of acrylonitrile.

Another object is to provide a process for the dimerization of acrylonitrile employing a promoter.

Other objects, aspects of this invention will become apparent to one skilled in the art upon consideration of the following disclosure and appended claims.

The feed for the process of this invention is acrylonitrile. The product which is obtained is the cyclodimer, 1,2dicyanocyclobutane. The product is obtained as a mixture of cis and trans isomers.

The 1,2-dicyanocyclobutane is a useful material being readily convertible to adiponitrile which is a nylon intermediate. For example, the 1,2-dicyanocyclobutane is reacted with hydrogen at atmospheric pressure in the presence of a reduced cobalt oxide catalyst at 175° to 400° C. for about 1 to 20 seconds to produce the adiponitrile.

The activators which are used in conjunction with the ultraviolet radiation of this invention are molybdenum hexacarbonyl ($Mo(CO)_6$) and tungsten hexacarbonyl ($W(CO)_6$). It is believed that these materials react to some degree with the acrylonitrile in the reaction zone to form a reaction product which may be a mixed complex. Consequently, if desired, the activators can also be reaction products of acrylonitrile and molybdenum or tungsten hexacarbonyl such as, for example, bis(acrylonitrile)tetracarbonylmolybdenum.

Preferably, the ultraviolet radiation which is required for the process of this invention is that radiation having a wavelength in the range of from about 2,000 to about 7,000 Angstroms, preferably 3,000 to 4,000 Angstroms. Such radiation is conventionally provided by suitable mercury lamps, mercury arcs, carbon arcs, tungsten lamps, hydrogen discharge tubes, and the like. The use of such radiation devices is well known to those skilled in the photochemical art.

The promoters which are used in conjunction with the ultraviolet radiation required for the process of this invention are organic phosphines, organic phosphites, and chelating organic diphosphines. These promoter compounds are represented by the following formulas: $R_3P$, $(RO)_3P$, and $R_2P$-$R^1$-$PR_2$, wherein R is an aromatic or saturated aliphatic radical having from one to about 20 carbon atoms; $R^1$ is an alkylene radical having from one to three carbon atoms; and wherein at least one aromatic radical is present on the promoter molecule.

Some specific examples of these promoters are:
Triphenylphosphine
Dimethylphenylphosphine
Tri(4-ethylphenyl)phosphine
Diphenyleicosylphosphine
Triphenylphosphite
B-Naphthyldimethylphosphite
Di(3,5-dimethylphenyl)ethylphosphite
1,2-Bis(diphenylphosphino)ethane
1,2-bis(diphenylphosphino)propane
1,3-Bis(diphenylphosphino)propane
tri(4-methylphenyl)phosphine
tri(4-methylphenyl)phosphite
tri(4-t-butylphenyl)phosphine, or
tri(4-t-butylphenyl)phosphite
and the like and mixtures thereof.

Although hypophosphorus acid ($H_3PO_2$) does not ordinarily act as a promoter itself, it is beneficial when mixed with the promoters shown above.

The cyclodimerization reaction can be carried out either in the presence or absence of a suitable diluent. Any diluent for acrylonitrile which is inert to ultraviolet radiation and inert to the contact with the other ingredients of the cyclodimerization zone can be used. Some examples of these are acetonitrile, diethyl ether, tetrahydrofuran, dioxane, petroleum ether, cyclopentane, cyclohexane, benzene, and the like, and mixtures thereof. The diluent, when used, usually comprises 10–95 volume percent of the reaction mixture.

The acrylonitrile, the activator compound, and the promoter compound (if used), are brought together under the influence of ultraviolet radiation and at a temperature in the range of from -100° C. to 100° C., preferably 0–50° C. Any pressure for maintaining a liquid phase can be used. The reaction time is generally in the range of from about 0.5 to about 30 hours, preferably 6–16 hours.

In the reaction zone, the proportion of the activator compound to the acrylonitrile is in the range of from about 0.5 to about 25 parts of activator compound per 100 parts acrylonitrile, preferably 1–10 parts per 100 parts acrylonitrile. This same range is applicable for the proportion of promoter materials (when used) to acrylonitrile.

After the desired reaction period, the reaction mixture can be conventionally processed to isolate and recover the 1,2-dicyanocyclobutane product. For example, the reaction mixture can be filtered to remove any solid materials, and then distilled to separate the product from the diluent and the catalyst components.

If desired, the soluble activator materials and the soluble promoter materials can be deposited on a suitable high surface solid catalyst support material such as silica, alumina, silica-alumina, and the like. These catalytic components are deposited on the solid in amounts which are substantially retained by the solid support during the liquid phase conversion reaction. The solid catalyst composite then can be separated more easily from the reaction mixture and more conveniently reused.

The advantages of this invention are further illustrated by the following examples. The reactants and proportions and other specific conditions are presented as being typical and should not be construed to limit the invention unduly.

A number of runs were made in which acrylonitrile was converted to 1,2-dicyanocyclobutane by the process of this invention. Each run was carried out in a quartz immersion reactor containing a water-cooled quartz jacket surrounding the ultraviolet lamp. The working volume of the reactor was about 25–30 cc.

The ultraviolet lamp was a 100-watt mercury lamp (General Electric H 100 A 38–4). The major bands of this high-pressure lamp were 3130 Angstroms and 3660 Angstroms. The lamp was powered with a 100-watt power source (General Electric H-4 LD-A Core and coil ballast 120/110 Y 3518). The general procedure was to add acrylonitrile, solvent, and catalyst system under a nitrogen atmosphere into the reactor. The reaction temperature was about room temperature, 25°–30 C. After the reaction was allowed to proceed to the desired time, the contents were filtered (unless there were no solids visible) and the filtrate subjected to gas liquid chromatographic analysis to determine the conversion of acrylonitrile to the desired product.

EXAMPLE I

In this example, a series of runs was carried out to demonstrate the effectiveness of the $Mo(CO)_6$ activator in the photochemical conversion of acrylonitrile (AN) to 1,2-dicyanocyclobutane (dimer). The runs were carried out as described above. Except as noted, the reaction time was 16 hours in each run. The other essential conditions and the results are shown in table I below.

TABLE I

| Run | AN, g. | $Mo(CO)_6$, g. | $\phi_3 P$, g. | $H_3PO_2$, g. | Polymer, g. | Conv. of AN to dimer, percent |
|---|---|---|---|---|---|---|
| 1 | 7.2 | 0 | 0 | 0 | Much | Trace. |
| 2 | 16 | 0.2 | 0 | 0 | Trace | 3.2. |
| 3 | 16 | 0.26 | 0.26 | 0 | 0.02 | 4.8. |
| 4 | 16 | 0.86 | 0 | 0.20 | 0.01 | 2.8. |
| 5 | 16 | 0 | 0.26 | 0.20 | Reactor contents solidified |  |
| 6 | 12.4 | 0.26 | 0.26 | 0.80 | 0.19 | 10.6. |

¹ A 5.5 hr. run which also contained an equal volume of acetonitrile diluent. Other runs contained no diluent.

Comparing run 1 and run 2 shows that the run with $Mo(CO)_6$ activator results in substantial dimer formation yet with little solid polymer formation. Run 3 shows that adding the triphenylphosphine ($\Phi_3 P$) promoter significantly improves the desired conversion to dimer. Run 6 shows that using a combination of triphenylphosphine and hypophosphorous acid ($H_3PO_2$) results in still more improved results which are surprising in view of runs 4 and 5 which show that the presence of hypophosphorous acid in the absence of $Mo(CO)_6$ or $\Phi_3 P$ shows no improvement.

EXAMPLE II

In this example the effectiveness of the hexacarbonyls of molybdenum, tungsten, and chromium were compared. The runs were carried out as described above. The reaction time was 16 hours and 16 g. acrylonitrile were used in each run. The other essential data and the results are shown in table 2 below.

TABLE II

| Run | Hexacarbonyl, g. | $\phi_3 P$, g. | $H_3PO_2$, g. | Polymer, g. | Conversion of AN to dimer, percent |
|---|---|---|---|---|---|
| 7 | Cr, 0.22 | 0.26 | 0.20 | Solidified to rubbery mass | |
| 8 | Mo, 0.35 | 0.26 | 0.20 | 0.1 | 6.5 |
| 9 | W, 0.35 | 0.26 | 0.20 | 0.12 | 5.9 |

Run 7 shows that $Cr(Co)_6$ is ineffective. Runs 8 and 9, on the other hand, show that $Mo(CO)_6$ and $W(CO)_6$ are effective as activators in the photochemical conversion of acrylonitrile to the desired dimer without producing significant amounts of solid polymer.

EXAMPLE III

Using the same general photochemical procedure as that shown in the preceding examples, acrylonitrile was dimerized to the 1,2-dicyanocyclobutane in reactions employing a diluent, namely, acetonitrile. Each run was made using 0.36 g. $Mo(CO)_6$, 0.36 g. triphenylphosphine, 8.8 g. acrylonitrile and 7.0 g. acetonitrile diluent. The results are shown in table III below.

TABLE III

| Run | Reaction time, hr. | Polymer, g. | Conversion of AN to dimer, percent |
|---|---|---|---|
| 10 | 5.75 | Nil | 4.0 |
| 11 | 6.0 | Nil | 6.0 |
| 12 | 7.5 | <0.01 | 7.6 |

These runs show that the photochemical process of the present invention can be carried out satisfactorily in the presence of an inert diluent such as acetonitrile.

EXAMPLE IV

In another invention run, the phosphorus-containing compound 1,2-bis(diphenylphosphino)ethane was used as a promoter. Thus, in a photochemical reaction similar to those above, the reaction mixture contained 0.13 g. $Mo(CO)_6$, 0.23 g. of the chelating diphosphine, 9 cc. of acrylonitrile and 9 cc. of acetonitrile diluent.

After a reaction period of 6.5 hours, it was found that only 0.1 g. polymer was formed and 12 percent of the acrylonitrile was converted to the desired dimer.

Although this invention has been described in considerable detail, it must be understood that such detail is for the purpose of illustration only and that many variations and modifications can be made by one skilled in the art without departing from the scope and spirit thereof.

I claim:

1. A process for the dimerization of acrylonitrile to 1,2-dicyanocyclobutane comprising contacting acrylonitrile with an activator of molybdenum hexacarbonyl or tungsten hexacarbonyl in the presence of ultraviolet radiation at temperatures ranging from −100° to 100° C. hexacarbonyl.

2. A process according to claim 1 wherein said activator is the reaction product of acrylonitrile and molybdenum hexacarbonyl or tungsten hexacarbonyl.

3. A process according to claim 1 wherein said contacting is carried out in the presence of a promoter represented by the formulas: $R_3P$; $(RO)_3P$ or $R_2P-R'-R_2P$ wherein R is an aromatic or saturated aliphatic radical having from one to 20 carbon atoms, R' is an alkylene radical having from one to three carbon atoms and at least one aromatic radical is present per molecule of promoter.

4. A process according to claim 3 wherein said promoter is triphenylphosphine, triphenylphosphite, 1,2-bis(diphenylphosphino)ethane, 1,2-bis(diphenylphosphino)propane, tri(4-methylphenyl)phosphine, tri(4-methylphenyl)phosphite, tri(4-t-butylphenyl)phosphine, or tri(4-t-butylphenyl)phosphite.

5. A process according to claim 3 wherein said promoter is triphenylphosphine or 1,2-bis(diphenylphosphino)ethane and said ultraviolet radiation has a wavelength in the range of 2,000 to 7,000 Angstroms.

6. A process according to claim 3 wherein hypophosphorus acid is employed with said promoter and said ultraviolet radiation has a wavelength in the range of 3,000 to 4,000 Angstroms.

7. A process according to claim 3 wherein said contacting is carried out at a temperature in the range of 0° to 50° C., under a pressure sufficient to maintain the reactants in substantially completely in the liquid phase and for a time in the range of 0.5 to 30 hours wherein the proportion of said activator to acrylonitrile is in the range of 0.5 to 25 parts of activator per 100 parts of acrylonitrile.

8. A process according to claim 3 wherein said activator can be supported on a high surface solid support of silica, alumina or silica-alumina.

9. A process according to claim 3 wherein said reacting is carried out in the presence of a substantially completely nonreactive diluent, wherein said diluent can comprise from 10 to 95 weight percent of the resulting reaction mixture.

10. A process according to claim 9 wherein said diluent is acetonitrile.

* * * * *

UNITED STATES PATENT OFFICE
CERTIFICATE OF CORRECTION

Patent No. 3,623,966          Dated November 30, 1971

Inventor(s) William B. Hughes

It is certified that error appears in the above-identified patent and that said Letters Patent are hereby corrected as shown below:

Column 4, line 46, cancel "hexacarbonyl".

Signed and sealed this 23rd day of May 1972.

(SEAL)
Attest:

EDWARD M. FLETCHER, JR.              ROBERT GOTTSCHALK
Attesting Officer                    Commissioner of Patents